(12) United States Patent
Potter et al.

(10) Patent No.: US 7,747,651 B2
(45) Date of Patent: Jun. 29, 2010

(54) METADATA MODELLING FOR REPORTING (75) Inventors: Charles M. Potter, Nepean (CA); Glen M. Seeds, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 10/835,236

(22) Filed: Apr. 29, 2004

(65) Prior Publication Data
US 2005/0027674 A1 Feb. 3, 2005

(30) Foreign Application Priority Data
Apr. 29, 2003 (CA) .................................. 2427159

(51) Int. Cl.
G06F 17/30 (2006.01)
(52) U.S. Cl. ...................... 707/795; 707/796
(58) Field of Classification Search ................ 707/100, 707/3, 1, 2, 4, 5, 102
See application file for complete search history.

(56) References Cited

U.S. PATENT DOCUMENTS

| | | | |
|---|---|---|---|
| 4,454,576 A | 6/1984 | Adam et al. | |
| 5,611,076 A * | 3/1997 | Durflinger et al. | 707/102 |
| 5,893,125 A * | 4/1999 | Shostak | 715/511 |
| 5,903,859 A | 5/1999 | McReynolds et al. | |
| 6,003,036 A | 12/1999 | Martin | |
| 6,411,961 B1 * | 6/2002 | Chen | 707/102 |
| 6,581,068 B1 | 6/2003 | Bensoussan et al. | |
| 6,658,627 B1 | 12/2003 | Gallup et al. | |
| 6,662,188 B1 * | 12/2003 | Rasmussen et al. | 707/102 |
| 6,738,762 B1 | 5/2004 | Chen et al. | |
| 6,847,962 B1 | 1/2005 | Cochrane et al. | |
| 6,996,566 B1 * | 2/2006 | George et al. | 707/100 |
| 6,999,977 B1 | 2/2006 | Norcott et al. | |
| 7,139,755 B2 * | 11/2006 | Hammond | 707/5 |
| 7,185,192 B1 | 2/2007 | Kahn | |
| 2003/0088558 A1 | 5/2003 | Zaharioudakis et al. | |
| 2003/0154277 A1 | 8/2003 | Haddad et al. | |
| 2004/0015470 A1 | 1/2004 | Smith et al. | |
| 2004/0015489 A1 * | 1/2004 | Anonsen et al. | 707/3 |
| 2004/0039729 A1 * | 2/2004 | Boger et al. | 707/2 |

(Continued)

FOREIGN PATENT DOCUMENTS

EP 0 413 486 2/1991

(Continued)

OTHER PUBLICATIONS

European Search Report for corresponding Application No. EP 04 01 0200, dated Sep. 15, 2004, 3 pages.

(Continued)

*Primary Examiner*—Don Wong
*Assistant Examiner*—Angela M Lie
(74) *Attorney, Agent, or Firm*—Shumaker & Sieffert, P.A.

(57) ABSTRACT

The invention comprises a method and system for reducing the apparent complexity faced by a user when confronted by this modeling environment. It provides for a metadata model that represents one or more data sources, the metadata model comprising a query layer combining the functions of a data access layer and a business layer. The query layer includes query subjects that describe how to retrieve data from the data sources, and the query subjects contain query items. The query layer also allows the use of data access language statements which permit the use of more complex computed query subjects and query items.

18 Claims, 3 Drawing Sheets

U.S. PATENT DOCUMENTS

| | | | |
|---|---|---|---|
| 2004/0249810 | A1 | 12/2004 | Das et al. |
| 2004/0268306 | A1 | 12/2004 | Cheng et al. |
| 2005/0004911 | A1* | 1/2005 | Goldberg et al. ............... 707/7 |
| 2005/0240606 | A1* | 10/2005 | Edelstein et al. ............ 707/100 |

OTHER PUBLICATIONS

John Brant et al., "Creating Reports with Query Objects," *Third Conference on Patterns Languages of Programs*, Sep. 1996, XP-002296204, http://www.cs.wustl.edu/{schmidt/PLoP-96/yoder.ps.gz>, 12 pages.

Office of Information Systems and Computing, University of Pennsylvania: "Business Objects Overview," Penn Computing, Apr. 15, 2003, XP-002296205, http://web.archive.org/web/20030415184801/http://www.upenn.edu/computing/da/bo/busobj5overview.html>, 15 pages.

Carolyn Begg, "Introduction to Microsoft Access 2000 Practicals," National Technical University of Athens, Department of Topography, Course Databases, 2000, XP-002296206, http://www.survey.ntua.gr/main/courses/general/dbintro/files/access_lab_practical_guide.pdf>, 24 pages.

* cited by examiner

METADATA MODELLING FOR REPORTING

FIELD OF THE INVENTION

The present invention relates generally to a metadata model, and more particularly to a metadata model used in a business intelligence and reporting system that accesses one or more data stores including relational databases,

BACKGROUND OF THE INVENTION

Currently, information reporting systems use predefined query techniques to hide the complexity of Structured Query Language (SQL) and relational databases. Typically, members of Management Information System (MIS) staff build a database solution by creating user-dedicated tables, relational views or predefined SQL queries. These are then made available to users by means of menus or similar techniques. In such systems, if end-users want to change the purpose of a query they usually ask the MIS staff to program another query. Alternatively the user may program the SQL query or command themselves. However, the syntax of non-procedural languages (in particular SQL) is complex, and typically, the data structure is not expressed in terms of the users' everyday work. Relational databases store information as well as metadata (i.e. data describing the data organisation), such as tables, columns, keys, indices, and their structure and design. Although suited to the overall needs of the customer organisation, these databases will likely contain much that is not of interest to a particular user. In addition, although a query may be syntactically correct, its results may not be what are expected, due to the inherent complexity of a large-scale database. Indeed, the results may be totally meaningless.

For these and other reasons modeling tools are often used that allow conceptual modeling of databases. These tools provide a layer on top of the database, and allow the underlying database to be accessed in terms that are more relevant to a particular end application. Such modeling tools include "Impromptu", "Transformer", and "Architect" by Cognos Incorporated.

U.S. Pat. No. 6,662,188 "Metadata model", Rasmussen, et al. issued Dec. 9, 2003, hereby incorporated by reference, describes a three level abstraction model for use in such environments. This is briefly described with reference to FIG. 2.

Figure 2:
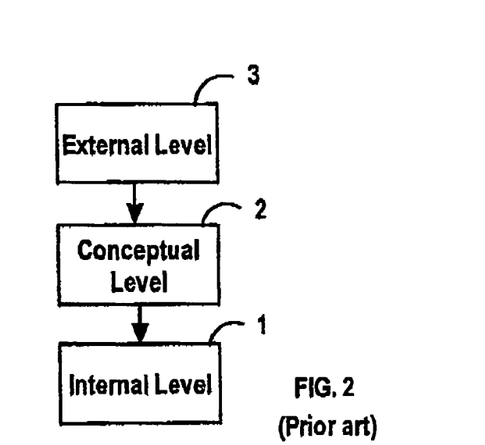
FIG. 2 is a diagram showing an example of database abstractions.

The lowest level in the database abstraction is the internal level 1. In the internal level 1, the database is viewed as a collection of files organized according to an internal data organization. The internal data organization may be anyone of several possible internal data organizations, such as B+-tree data organization and relational data organization.

The middle level in the database abstraction is the conceptual level 2. In the conceptual level 2, the database is viewed at an abstract level. The user of the conceptual level 2 is thus shielded from the internal storage details of the database viewed at the internal level 1.

The highest level in the database abstraction is the external level 3. In the external level 3, each group of users has their own perception or view of the database. Each view is derived from the conceptual level 2 and is designed to meet the needs of a particular group of users. To ensure privacy and security of data, each group of users only has access to the data specified by its particular view for the group.

The mapping between the three levels of database abstraction is the task of the Database Management System (DBMS). When the data structure or file organization of the database is changed, the internal level 1 is also changed. When changes to the internal level 1 do not affect the conceptual level 2 and en level 3, the DBMS is said to provide for physical data independence. When changes to the conceptual level 2 do not affect the external level 3, the DBMS is said to provide for logical data independence.

Typical DBMSs use a data model to describe the data and its structure, data relationships, and data constraints in the database. Some data models provide a set of operators that are used to update and query the database. DBMSs may be classified as either record-based systems or object-based systems. Both types of DBMSs use a data model to describe databases at the conceptual level 2 and external level 3.

Data models may also be called metadata models as they store metadata, i.e., data about (or describing) data in databases. Three main existing data models used in record based systems are the relational model, the network model and the hierarchical model.

In the relational model, data is represented as a collection of relations. To a large extent, each relation can be thought of as a table. A typical relational database contains catalogues, each catalogue contains schemas, and each schema contains tables, views, stored procedures and synonyms. Each table has columns, keys and indexes. A key is a set of columns whose composite value is distinct for all rows. No proper subset of the key is allowed to have this property. A table may have several possible keys. Data at the conceptual level 2 is represented as a collection of interrelated tables. The tables are normalized so as to minimize data redundancy and update anomalies. The relational model is a logical data structure based on a set of tables having common keys that allow the relationships between data items to be defined without considering the physical database organization.

A known high level conceptual data model is the Entity-Relationship (ER) model. In an ER model, data is described as entities, attributes and relationships. An entity is any about which data can be stored. Each entity has a set of properties, called attributes, which describe the entity. A relationship is an association between entities. For example, a professor entity may be described by its name, age, and salary gad can be associated with a department entity by the relationship "works for". Existing information systems use business intelligence tools or client applications that provide data warehousing and business decision making and data analysis support services using a data model. In a typical information system, a business intelligence tool is conceptually provided on the top of a data model, and underneath of the data model is a database. The data model of existing information systems typically has layers corresponding to the external level 3 and the internal level 1.

Existing data models are used for the conceptual design of databases. When a system designer constructs an information system, the designer starts from a higher abstraction level 3 and moves down to a lower abstraction level 1, as symbolized in FIG. 2 by arrows. That is, the system designer first performs logical design. At the logical design stage, the designer considers entities of interest to the system users and identifies, at an abstract level, information to be recorded about entities. The designer the determines the conceptual scheme, i.e., the external level 3 and/or conceptual level 2 of a data model. After the logical design is completed, the designer next performs physical design. At the physical design stage, the designer decides how the data is to be represented in a database. The designer then creates the corresponding storage scheme, i.e., the structure of a database, and provides mapping between the internal level 1 of the data model and the database.

Existing business intelligence tools typically provide a different paradigm for retrieving and delivering information from a database. Accordingly, it is difficult to share information in the database among different business intelligence tools.

It is common that in a single organization, each group of users has its own established information system that uses its corresponding database. Thus, a single organization often has multiple databases. Those databases often contain certain types of information that are useful for multiple groups of users. Such types of information may include information about business concepts, data retrieval, and user limits and privileges. However, each information system is designed and constructed in accordance with specific needs of the group, and may use a different business intelligence tool from others. These differences in the information systems and business intelligence tools used do not allow sharing the information already existing in the databases among multiple groups of users.

The previous invention, "Metadata Model—Rasmussen, et al", describes ai data model or metadata model that realizes the three abstraction levels and provides information that can be shared by multiple users who use those different business intelligence tools or client applications. It also provides for a metadata model to contain model objects representing one or more data sources. The data sources contain tables having columns. The metadata model comprises a data access layer, a business layer and a package layer. The data access layer contains data access model objects. The data access model objects include table objects that describe definitions of the tables contained in the data sources, and column objects that describe definitions of the columns of the tables contained in the data sources. The business layer contains business model objects. The business model objects include entities that are constructed based on the table objects in the data access layer, and attributes that are constructed based on the column objects in the data access layer. The package layer contains package model objects. The package model objects include a package model object that references a subset of the business model objects.

What is needed is a way to reduce the apparent complexity and inherent learning barrier to the use of the earlier invention.

BRIEF SUMMARY OF THE INVENTION

The present invention introduces a method and system that reduces the apparent complexity faced by a user when confronted by this modeling environment.

In one aspect the invention provides for a method for use in a computer-based business intelligence system having a client application receiving user inputs, comprising importing a database using a database schema, defining model objects within a query layer that are directly related to the imported database, creating one or more packages containing references to appropriate query objects, receiving inputs from a user to select appropriate combinations of model objects from the one or more packages, selecting data from the imported database using the selected appropriate combinations of model objects, and creating and presenting to a user a report incorporating the selected data.

In a second aspect the invention provides for a computer-based business intelligence system having a client application receiving user inputs, comprising means for importing a database using a database schema, means for defining model objects within a query layer that are dizzy related to the imported database, means for creating one or more packages containing references to appropriate query objects, means for receiving inputs from a user to select appropriate combinations of model objects from the one or more packages, ms for selecting data from the imported database using the selected appropriate combinations of model objects, and means for creating and presenting to a user a report incorporating the selected dam.

A number of advantages will be apparent from tee following description and associated claims. Relationships for the various query items are defined so that they are not necessarily based directly on the underlying database columns. Users are provided with a choice of mechanisms for defining the contents of a query subject in terms of the underlying database, or in terms of newly defined modelling objects, or in combinations. The definition of a query subject can be changed directly without reliance on a separate modelling layer, A package can to be a reference to a folder in the model the model including a hierarchy. Any sub-tree of the model hierarchy may be published as a package for a particular audience.

BRIEF DESCRIPTION OF DRAWINGS

Embodiments of the invention will be described with reference to the following drawings.

DETAILED DESCRIPTION OF THE INVENTION

Figure 1:
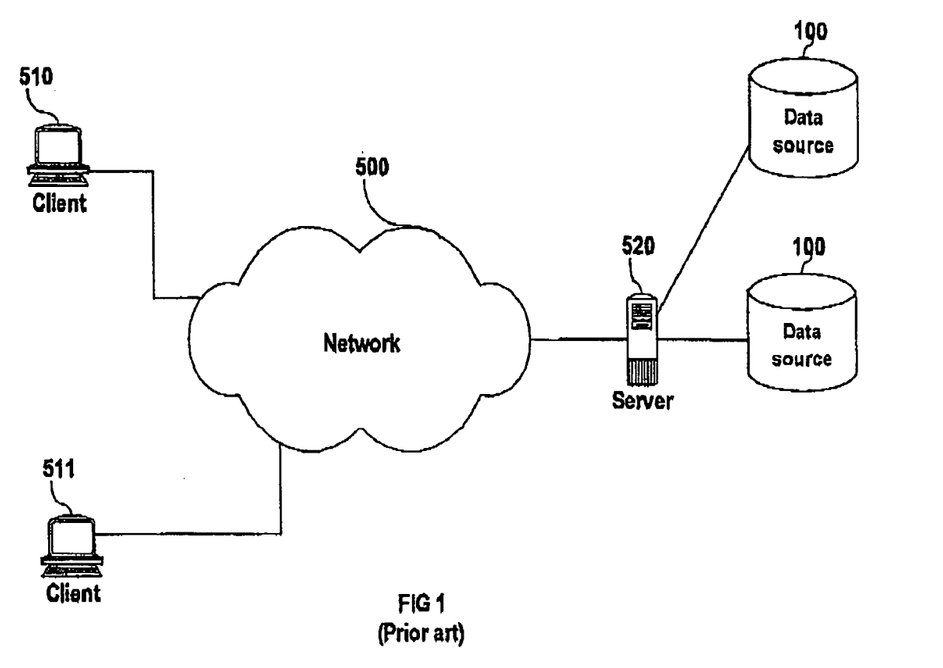
FIG. 1 shows a general purpose computing environment in which the invention may be practiced.

AU embodiments of the invention may conveniently be implemented on any general purpose computing platform including one incorporated in a client/server or networked environment, such as that described with reference to FIG. 1 in which one or more client computers 510, 511 are connected over a network 500 to a server 520, itself connected to at least one data source 100. We now describe preferred embodiments of the present invention.

Although the abstraction levels described in the earlier invention are necessary, presenting them directly to modelers creates a substantial learning barrier to those using the tool because the levels are not related to how the users perceive the data.

In order to make the model as useful as practicable, it is necessary to reduce these barriers to the point where the operation of the model is intuitive to users that understand the results expected from a reporting application, but who only have limited knowledge of the underlying database, or of database analysis techniques generally. In this context, users are the people (model designers and report authors) who develop report outlines or templates.

We therefore introduce new concepts, requiring (or rather resulting in) the definition of related new terminology. This new terminology is described in this new context. The new terms are then used with the concepts to describe one embodiment of the invention. In doing so, the various simplifications, and rationalizations made to the original concept as described in the previous patent (Metadata Modeling) are made clear.

Figure 3:
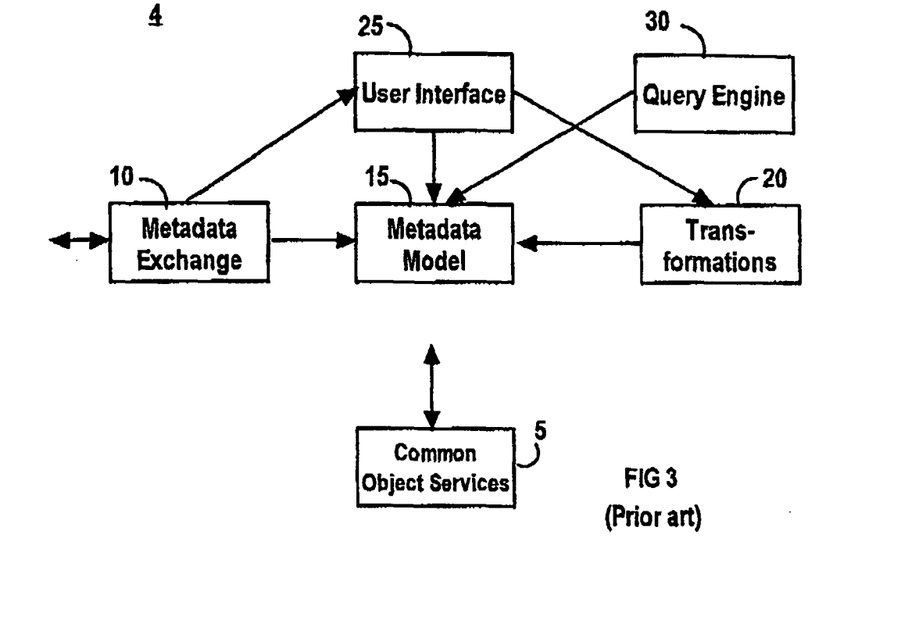
FIG. 3 is a diagram showing an example of a reporting system to which an embodiment of the present invention may be applied.

FIG. 3 illustrates a reporting system 4 to which an embodiment of the present invention is suitably applied. The reporting system 4 provides a single administration point for metadata that supports different business intelligence tools or client applications. Thus, it enables different business intelligence tools to extract and interpret data from various data sources in the same way.

The reporting system 4 includes common object services (COS) 5, a metadata exchange 10, a meta model 15, a metadata model transformer or transformations 20, a user interface 25 and a query engine 30. The fundamental objective of the reporting system 4 is to provide a rich business-oriented metadata model 15 that allows tee query engine 30 to generate the best queries of which it is capable, and allows users to build queries, reports and cubes with the aid of the query engine 30 to obtain desired reports firm underlying data sources. It is to this end that COS 5, metadata exchange 10 and transformations 20 are provided.

Figure 4:
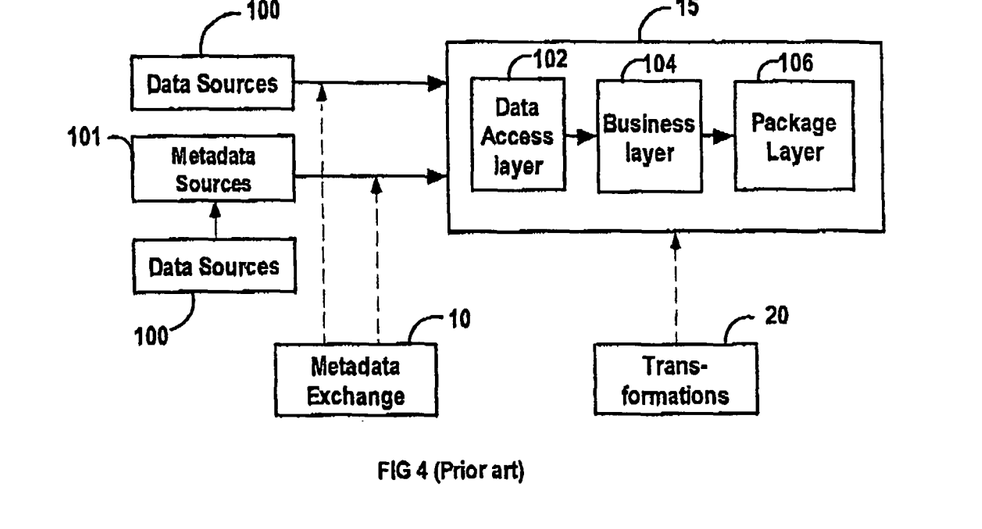
FIG. 4 is a diagram showing functions of the metadata exchange, metadata model and transformations according to prior art.

Prior to describing the metadata model 15 and the transformations 20 in detail, each element of the reporting system 4 is briefly described, referring both to FIG. 3 and FIG. 4.

Referring first to FIG. 3, COS 5 defines the framework for object persistence. Object persistence is the storage, administration and management of objects on a physical device and transfer of those objects to and from memory, as well as the management of those objects on the physical device. The double head arrow from COS 5 in FIG. 3 represents that COS 5 communicates with all other elements shown in FIG. 3. COS 5 performs functions such as creating new objects, storing them on disk, deleting them, copying them, moving them, handling change isolation (check-in, check-out) and object modeling.

Turing now to FIG. 4, the metadata exchange 10 is used to obtain metadata from external physical sources. Metadata is obtained from one or more external sources of metadata. External sources of metadata may be one or more data sources 100 and/or one or more metadata sources 101, Data sources 100 contain physical data. Examples of data sources 100 include databases and files. Metadata sources 101 contain descriptive information about data sources. Metadata sources 101 are also known as metadata repositories. Metadata repositories may be third party repositories. Metadata sources 101 generally have underlying data sources 100 containing physical data. The metadata exchange 10 facilitates importation of metadata from external sources 100 and 101 into the metadata model 15. Also, the meta data exchange 10 may facilitate exportation of metadata from the metadata model 15 to external metadata repositories.

The metal model 15 stores metadata about its underlying one or more data sources 100. It is used to provide a common set of business-oriented abstractions of the underlying dam sources 100. The metadata model 15 defies the objects that are needed to define client applications that users build. The metadata model 15 provides three layers to realize three levels of abstractions of data sources 100 as described above referring to FIG. 2. The three layers are a physical layer or data access layer 102, a business layer 104 and a presentation layer or package layer 106.

Transformations 20 are used to complete the metadata model 15. For example, when a database is introduced to the reporting system 4, metadata is imported from the database into the metadata model 15. Metadata may also be imported form one or more metadata repositories or other data sources 100. Sufficient metadata may be imported from a database that would build only a small number of the objects that would actually be needed to execute queries. However, if such metadata does not have good mapping to the metadata model 15, then the transformations 20 can be used to complete the metadata model 15.

Returning to FIG. 3, the user intake 25 is layered on top of the metadata model 15 as a basic maintenance facility. The user interface 25 provides users with the ability to browse through the metadata model 15 and manipulate the objects defined thereby.

The query engine 30 is responsible for taking the metadata model 15 and a user's request for information, and generating a query that can be executed against the underlying data sources 100, e.g., relational databases. The query engine 30 is basically the reason for the educe of the rest of the blocks. The objective of the query engine 30 is to function as efficiently as possible and to preserve the semantics of the original question. A user may ask a question that is not precise. The request may be for something from "customers" and something from "products". The query engine 30 then determines from the metadata model 15 which relationship is used to relate "customers" and "products" to provide the use with information requested.

Figure 5:
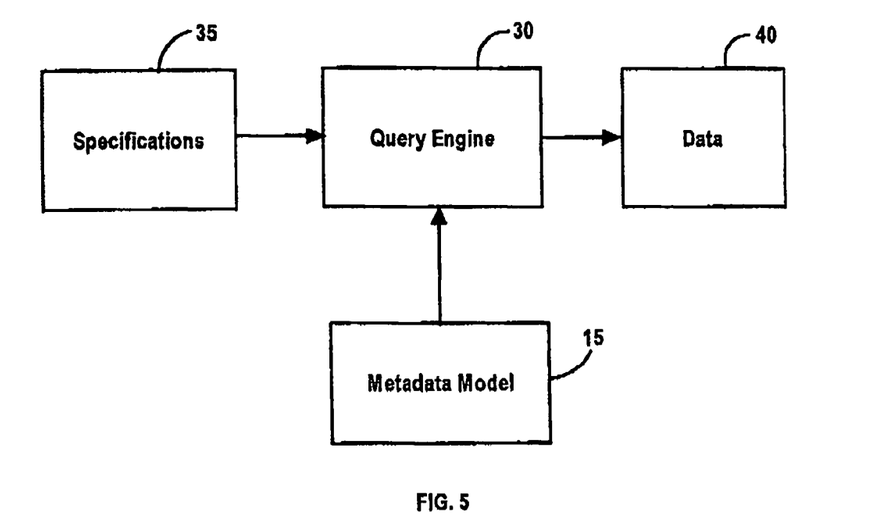
FIG. 5 illustrates the use of the metadata model by the query engine.

The use of the metadata model 15 by the query engine 30 is further described with reference to FIG. 5. A user uses a business intelligence tool or client application (not shown) to generate a user's request for information. Upon the receipt of the user's request, the client application generates an initial specification 35 based on the request. The specification 35 is generally not in a form that can be applied to the data sources directly. Using the information that is built in the metadata model 15, the query engine 30 makes the specification 35 unambiguous and builds a query in terms of the data access layer 102 for the specification 35. This intermediate formulation of the query is subsequently translated into a data source specification language, which may be Structured Query Language (SQL). A query in a data source specification language can be executed on the data sources 100. Thus, the correct data 40 may be obtained.

The metadata model 15 provides a unified and centralized modeling environment, and application program interfaces for business intelligence tools. The metadata model 15 is composed of several layers, namely, a physical layer or data access layer 102, a business layer 104 and a presentation layer or package layer 106. These layers correspond to abstraction levels described earlier with reference to FIG. 1.

Figure 6:
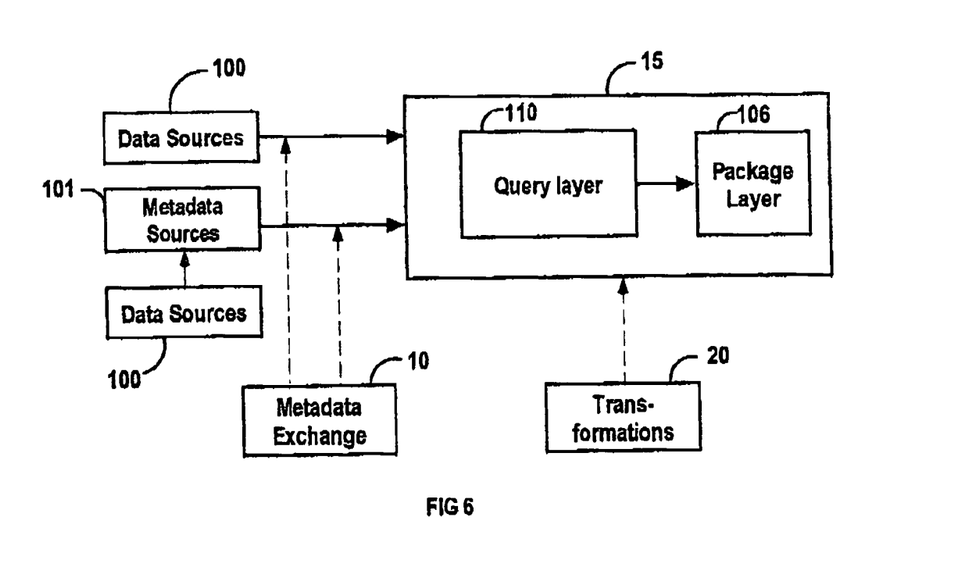
FIG. 6 is a diagram showing functions of the metadata exchange, metadata model a transformations according to an embodiment of the present invention

Referring now to FIG. 6, one of the changes required to carry out embodiments of the present invention are shown and described. Specifically, the access layer and business layer of the previous system are combined and a new combined element, the query layer 110 is provided. This is possible because the entities and attributes used in defining the model have been replaced by the more powerful concepts of "query subjects" and "query items". In other respects the operation is as described with reference to FIG. 4 above.

In embodiments of the invention, when a database schema is imported, the system a set of unified database query subjects are created within the query layer 110. These query subjects are directly tied to the underlying database, and are also directly usable in creating reports. These query subjects bring together all of the abstraction and mapping than the previous invention (Metadata Modeling) handled with 'connections' between physical and logical segments of the model. In contrast to a 'view', which is defined by the database administrator DBA, a query subject is abstracted and separate from the underlying database, is applicable to and able to translate different kinds of databases, and provides a translation of the data and metadata into the terminology of the user.

The query layer 110 includes metadata that describes how to retrieve physical data from data sources 100. It is used to formulate and refine queries against the underlying data sources 100. The underlying data sources 100 may be a single or multiple data sources, as described above. Examples of data sources 100 include relational databases, such as Oracle, Sybase, DB2, SQL Server and Informix.

The query layer 110 contains model objects that directly describe actual physical data in the data sources 100 and their relationships. These model objects are called query subjects, and they in turn contain query items, which are attributes and relate the columns of the underlying databases. The query subjects may include, among other things, databases, catalogues, schemas, tables, files, columns, data access keys, indexes and data access joins, as well as data query language code such as SQL that assists in the transformation of the data. Each query subject has one or more columns. Data access joins exist between query subjects.

The query subjects in the query layer 110 may be thought of as extended metadata, created as a result of import metadata from data sources 100 and metadata sources 101 provided by users. The information of some data access objects may be available from the underlying data sources 100. Users can customize some objects in the data access layer 102 in order to create data access joins, i.e., relationships between objects at were imported from various data sources.

The query layer 110 also describes the business view of the physical data in the underlying data sources 100. It is used to provide business abstractions of the physical data with which the query engine 30 can formulate queries against the underlying dam sources 100.

The query layer 110 contains information encapsulated in the query subjects and query items that can be used to define in abstract terms the user's business entities and their interrelationships. These query subjects are reusable objects that represent the concepts and structure of the business to be used in business intelligence environments. They present a single unified bless model, with direct relationships to the underlying databases, and cal be related to physical data in a number of different data sources 100. The query layer also includes business rules and display rules. As well as query subjects and query items, the query layer may include keys and joins. Since the query subjects within the query layer 110 have the ability to incorporate data query language statements, they may be used directly in creating reports.

In embodiments of the invention, the presentation of the business-oriented objects is simplified by having a package be simply a reference to a folder in the model. Simple applications are modelled as a hierarchical business structure. Any sub-tree of this structure may be published as a package for a particular audience. If there is more than one package, then each package is a subset of the model appropriate for a particular reporting application.

The various parts of the query layer 110 are closely related to the underlying data in that, for example, query subjects are related to tables in the data sources 100, and query items correspond to columns in the underlying data sources 100. Business joins exist between query subjects. The new concepts of query subjects and query items are not totally analogous to their related tables and columns, since they permit an extra level of referencing, thereby providing powerful new benefits as will be obvious from the following description. Each business model object has a partner in hew query layer 110, i.e., a relationship exists between a table and an entity.

The query subjects also hold the metadata representing the business concept. Query subjects are collections of attributes.

Query items within the query layer 110 contain expressions related to columns of tables in the underlying database. A query item is usually directly related to a single column of the underlying data sources 100. For example, the query subject "customer" could have query items "customer name", "customer address", and the like. In the simplest case, all the query its of a query subject in the query layer 110 are related one-to-one to the columns of a single table in the underlying data sources 100. However, the relationship is not always a one-to-one relationship. Also, a query item may be expressed as a calculation based on other query items, and constants, (and columns). For example, a query item may be a summary of data in other query items, e.g., a total amount of all the orders placed by customer.

Embodiments of the present invention thus provide a query layer that describes, for relevant data, how the data is to be retrieved or imported from the data sources, and also provides a 'business-oriented' view of that data. This is in contrast to earlier systems, where these aspects are separated into the data access model layer, and the business layer.

During the importation process, the query subjects are converted to 'objects' containing embedded data query language statements, such as SQL. During use, such objects may be inserted into existing data query language statements and the embedded data query language takes care of ensuring consistent syntax. A Graphical User Interface (GUI) that supports 'drag and drop' of data source tables and columns (not objects) into the data query language statements makes data query ague editing easy. The appropriate data query language syntax is created for these references and inserted into the data query language being edited. Further, a query subject is able to be augmented with query items and filters that use expressions based on model objects (query items of this query subject or others). In this case, the data query language for the query subject stored in the model is not affected. Rather, when a report is run that uses this query subject, the system generates data query language that combines the base data query language of the query subject with data query language created using such augmented query subjects.

Additional levels of abstraction can be built for different levels of reporting by creating model query subjects whose query items are simply references to other query items, which can be in either database queries or model queries. In other words, references to references can be used, to any arbitrary depth.

Embodiments of the invention use one or more of the following concepts:

- The creation of a single query layer to replace what previously required two layers, viz. the data access layer and the business layer.
- Within the query layer, access to the underlying databases is facilitated by the possibility of embedding of database access statements in a database query object (known as a query subject).
- Creation of objects appropriate to the user is facilitated by the inclusion of query items within the query subjects, and the ability to use query items and query subjects freely within the query layer.
- An extended form of database query language allows the inclusion of filters (or filter expressions) and calculation building blocks capable of acting both on query subjects and on query items contained in the query subjects. These extensions to the database query language are not constrained by the capabilities of the underlying databases and their related database query languages.

Embodiments of the invention offer the following advantages:

The ability to define relationships for the various query items so that they are not necessarily based directly on the underlying database columns.

The ability to provide users with a choice of mechanism for defining the contents of a query subject in terms of the underlying database, or in terms of newly defined modelling objects, or in combinations thereof.

The ability to change the definition of a query subject directly without reliance on a separate modelling layer.

The ability of having a package to be a reference to a folder in the model, the model including a hierarchy.

The ability to allow any sub-tree of the model hierarchy to be published as a package for a particular audience.

In embodiments of the invention the concepts of entities (distinguishable objects to be represented in the database—usually by rows in relations) and attributes (columns or fields in a table)—are replaced by the concepts of query subjects (i.e. the subjects of the relational query) and query items (i.e. particular attributes of a query subject, or rather a pointer or something that can be de-referenced as necessary to ultimately provide those attributes). These new concepts imply fat an extra level of referencing is possible, providing powerful new benefits. In some embodiments, query items are defined as expressions. In other embodiments, both query items and filter expressions use model query items.

Embodiments of the invention have been found especially useful when the changes required to define the query view based on the physical view are relatively few. The increasing use of data warehousing has resulted in more situations in which this circumstance is true.

What is claimed is:

1. A method for providing a query to obtain data from a data source using a client application, the method comprising:
   providing, by a computer, a metadata model including model objects representing the data source, the metadata model having a query layer and a package layer, the query layer providing a business view of the data in the data source, the query layer including query subjects, wherein the query subjects directly describe actual physical data within an underlying database, are used in creating reports, and are abstracted and separate from the underlying database that includes physical data from one or more data sources, and wherein the package layer includes packages having direct references to the query subjects;
   generating a query specification based on a user input using the client application, the query specification is not in a form applicable to the data source directly;
   translating the generated query specification by the computer into a query applicable to the data source based on the query subjects referred to by the packages in the package layer in the metadata model, wherein the query is executed using a data source specification language of the data source, and wherein the query includes data query language statements that are embedded within the query subjects in the metadata model; and
   providing the query to the data source for execution.

2. The method of claim 1, further comprising including filters and calculation blocks that act on the query subjects.

3. The method of claim 1, further comprising converting the query subjects to objects including the data query language statements embedded within the objects.

4. The method of claim 1, wherein the query subjects translate different kinds of databases, and provide a translation of the data and metadata into a terminology of a user.

5. The method of claim 1, wherein the generating further comprises providing in the query specification a reference to the query; and the translating further comprises using the model objects based on a reference in the query specification to translate the query specification.

6. The method of claim 1, further comprising directly changing definitions of the query subjects in the metadata model without reliance on a separate modeling layer.

7. The method of claim 1, wherein the query layer includes query items that are attributes of the physical data.

8. A system comprising:
   at least one computing device;
   a metadata model generator configured in the at least one computing device to provide a metadata model including model objects representing a data source, the metadata model having a query layer and a package layer, the query layer providing a business view of the data in the data source, the query layer including query subjects, wherein the query subjects directly describe actual physical data within an underlying database, are used in creating reports, and are abstracted and separate from the underlying database that includes physical data from one or more data sources, and wherein the package layer includes packages having direct references to the query subjects;
   a query specification interface configured in the at least one computing device to allow a client application to generate a query specification based on a user input, the query specification is not in a form applicable to the data source directly; and
   a translator configured in the at least one computing device to translate the generated query specification into a query applicable to the data source based on the query subjects referred to by the packages in the package layer in the metadata model, wherein the query is executed using a data source specification language of the data source, and wherein the query includes data query language statements that are embedded within the query subjects in the metadata model; and
   a sender configured in the at least one computing device to provide the query to the data source for execution.

9. The system of claim 8, wherein the translator comprises filters and calculation blocks that act on the query subjects.

10. The system of claim 8, wherein the translator converts the query subjects to objects including the data query language statements embedded within the objects.

11. The system of claim 8, wherein the query subjects translate different kinds of databases, and provide a translation of the data and metadata into a terminology of a user.

12. The system of claim 8, wherein the metadata model generator directly changes definitions of the query subjects in the metadata model without reliance on a separate modeling layer.

13. The system of claim 8, wherein the query layer includes query items that are attributes of the physical data.

14. A computer readable storage medium comprising instructions that cause a computing device to:
   provide a metadata model including model objects representing the data source, the metadata model having a query layer and a package layer, the query layer providing a business view of the data in the data source, the query layer including query subjects, wherein the query subjects directly describe actual physical data within an underlying database, are used in creating reports, and are abstracted and separate from the underlying database that includes physical data from one or more data sources, and wherein the package layer includes packages having direct references to the query subjects;

generate a query specification based on a user input using the client application, the query specification is not in a form applicable to the data source directly;

translate the generated query specification by the computer into a query applicable to the data source based on the query subjects referred to by the packages in the package layer in the metadata model, wherein the query is executed using a data source specification language of the data source, and wherein the query includes data query language statements that are embedded within the query subjects in the metadata model; and provide the query to the data source for execution.

15. The computer readable storage medium of claim 14, further comprising instructions that cause the computing device to convert the query subjects to objects including the data query language statements embedded within the objects.

16. The computer readable storage medium of claim 14, wherein the query subjects translate different kinds of databases, and provide a translation of the data and metadata into a terminology of a user.

17. The computer readable storage medium of claim 14, further comprising instructions that cause the computing device to directly change definitions of the query subjects in the metadata model without reliance on a separate modeling layer.

18. The computer readable storage medium of claim 14, wherein the query layer includes query items that are attributes of the physical data.

* * * * *